United States Patent
Barker et al.

(10) Patent No.: US 6,388,581 B1
(45) Date of Patent: May 14, 2002

(54) METHOD AND SYSTEM FOR MONITORING THE PROPER OPERATION OF A DEBITING DEVICE

(75) Inventors: Ronald Barker; Günther Weber, both of München; Ralph Wolters, Schonstett, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/744,896

(22) PCT Filed: Jul. 14, 1999

(86) PCT No.: PCT/DE99/02193

§ 371 Date: Jun. 13, 2001

§ 102(e) Date: Jun. 13, 2001

(87) PCT Pub. No.: WO00/10132

PCT Pub. Date: Feb. 24, 2000

(30) Foreign Application Priority Data

Jul. 31, 1998 (DE) .......................................... 198 36 087

(51) Int. Cl.$^7$ ................................................. G08G 1/00
(52) U.S. Cl. .................... 340/928; 340/932.2; 340/933; 705/13
(58) Field of Search .............................. 340/928, 932.2, 340/933; 705/13

(56) References Cited

U.S. PATENT DOCUMENTS 6,252,523 B1 * 6/2001 Mostrom ..................... 340/928
6,259,376 B1 * 7/2001 Fuyama ....................... 340/928
6,278,935 B1 * 8/2001 Kaplan et al. ............... 701/200
6,285,858 B1 * 9/2001 Yoshida ........................ 455/41
6,304,192 B1 * 10/2001 Kawasaki .................... 340/928

* cited by examiner

Primary Examiner—Daryl Pope
(74) Attorney, Agent, or Firm—Cohen, Pontani, Lieberman & Pavane

(57) ABSTRACT

A method for monitoring the correct operation of an electronic debiting appliance which is arranged in a vehicle and makes log entries on a mobile memory module in the context of a use accounting system for the use of a road network or for the entering of a stipulated geographical zone by the vehicle. The use of the road or geographical zone which is subject to charges is automatically recognized by the debiting appliance on the basis of data which is held in a carried memory device and identifies the roads or geographical zones which are subject to charges, and on the basis of data which can be received wirelessly in the vehicle from a navigation satellite system for the purpose of determining the particular current geographical vehicle position. A control device is used which is also set up for receiving data from the navigation satellite system. Besides the time of address, both the control device and the debiting appliance also record the respective data received from the navigation satellite system at this time on the respective nonvolatile memory. During the later control on the debits entered on the mobile storage medium in the vehicle being controlled, a check is carried out to determine whether the navigation satellite system's data recorded in the nonvolatile memory in this vehicle at the time of address by the control device corresponds to the navigation satellite system's data recorded for this time by the control device itself.

13 Claims, 1 Drawing Sheet

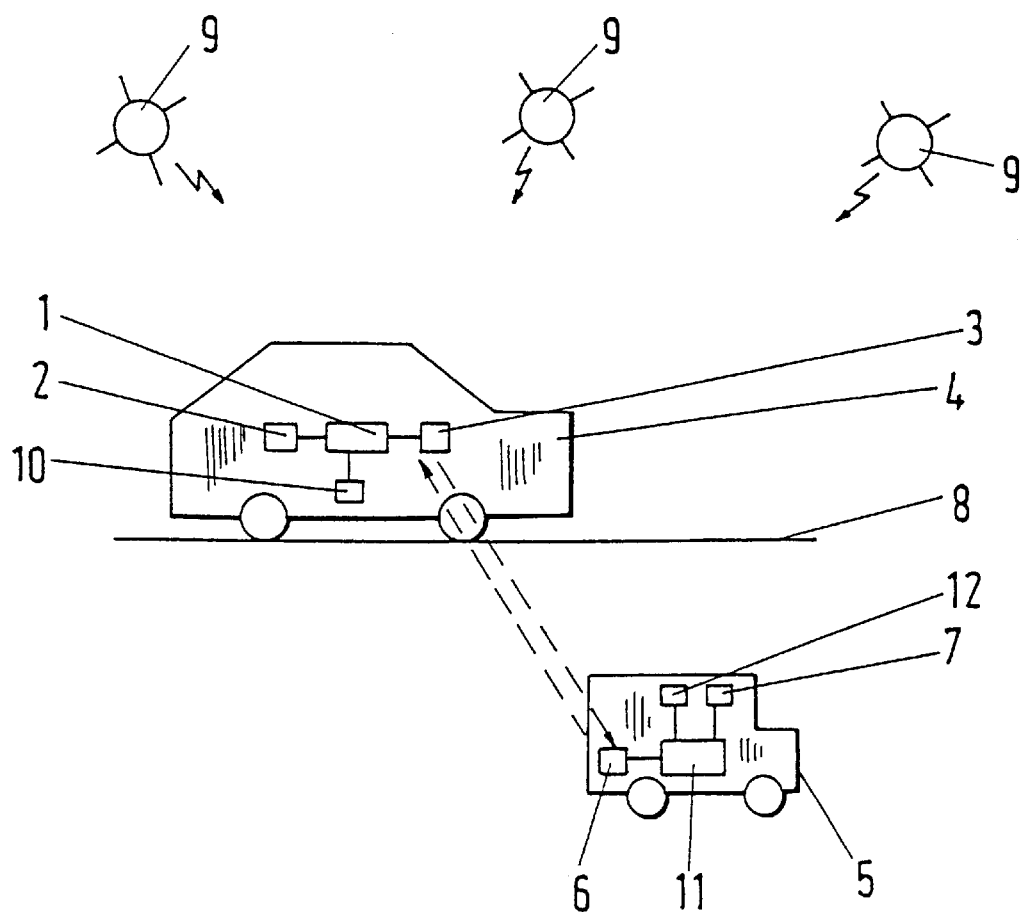

METHOD AND SYSTEM FOR MONITORING THE PROPER OPERATION OF A DEBITING DEVICE

BACKGROUND OF THE INVENTION

1. Field of the Invention

The invention relates to a method for monitoring the correct operation of an electronic debiting appliance, arranged in a vehicle, for the use of a road network or for the entering of a stipulated geographical zone by the vehicle, in accordance with the preamble to patent claim 1. The invention also relates to a system for carrying out this monitoring method.

2. Discussion of the Prior Art

DE 43 10 099 A1 discloses an electronic device within the meaning of a debiting appliance which makes log entries on a mobile memory module in the context of a use accounting system for the use of a road network or for the entering of a stipulated geographical zone by the vehicle, i.e. for the time spent in this geographical zone. This mobile memory module carried in the vehicle can be used like a value card, such as a telephone card. The use of the road which is subject to charges or of the stipulated geographical zone by the vehicle can be automatically recognized by the debiting appliance on the basis of data which is held in a carried memory device and identifies the roads or geographical zones which are subject to charges. This identifying data characterizes geographical positions and is compared by the debiting appliance with the current geographical position of the respective vehicle. This up-to-date information for the vehicle is ascertained on the basis of data which can be received wirelessly in the vehicle from a navigation satellite system. In one preferred embodiment of this debiting appliance, the debiting appliance can transmit an "in order" signal from the vehicle to the outside when the debiting appliance is operating correctly. This is intended to provide a control option for discovering users of the road system or of the geographical zone who do not wish to pay prescribed charges for using the road system or the geographical zone and, by way of example, do not switch on the debiting appliance, or else use a value card containing insufficient charge credit.

To introduce such an electronic use accounting system, which is largely intended to require no infrastructure permanently installed along the road network or in the geographical zones, it is necessary, on the one hand, for it to be possible to effect as reliable a control as possible to ascertain unauthorized instances of use, and, on the other hand, for legal data protection provisions not to be infringed. This means that, in the context of the controls which are to be carried out, it is absolutely essential that the anonymity of the respective vehicle being controlled and of its occupants be assured in the case of unobjectionable use.

To make it possible to check the debits actually performed for the use of individual sections of a road network (in the following text this is also used to mean instances of the use of stipulated geographical zones, according to context), it is possible to provide for each of the log entries made on the mobile memory module also to record identifying data for the section of the road network which is currently being used, and also for the time of the respective use, for the purposes of an electronic receipt. When a vehicle is subsequently being controlled, the recorded data in the memory module, which, by way of example, remains stored for a certain period of time (e.g. a few weeks), could be used to prove that the vehicle has actually performed the debits required in each case for the use of a particular road. However, such a control option does not preclude deliberate instances of manipulation. Thus, for example, two drivers who know each other and are driving on the same road at the same time in separate vehicles could agree that only one of the two drivers operate his debiting appliance correctly, while the other driver uses the road network as a "toll dodger". If this unauthorized use is now discovered as a result of a control station at the edge of a road wirelessly interrogating the debiting appliances in the passing vehicles about their correct operation, and the debiting appliance of the "toll dodger" not transmitting the requested "in order" signal, then the driver or occupant of this vehicle can later be brought to account. However, he would then be able to present the electronic receipt on the mobile memory module in his "friend's" vehicle, passing the control station at the same time as he. He could thus evade legal proof of his unauthorized use of the road network by fraudulent means.

GB 2 295 466 A, forming the generic type, discloses an accounting system whose fundamental features largely match those of the use accounting system in accordance with DE 43 10 099 A1 and in which the individual log entries on the mobile memory module used as a value card are recorded by recording identifying data (geographical coordinates) for the particular road section used by the vehicle or for the geographical zone entered together with the time of use as a receipt for subsequent control purposes. To this end, the debiting appliance installed in the respective vehicle can be wirelessly addressed by control devices which, by way of example, are installed on highway bridges above the highway and are each permanently assigned to one lane. The time of address is recorded on a nonvolatile memory both in the addressed debiting appliance and in the respective control device. In the case of correct operation, which is established in the debiting appliance itself by means of self-monitoring, a corresponding status message is sent to the monitoring device. If such a status message signaling correct operation is not sent, the control device stores information for identifying the vehicle which is passing the control device (e.g. takes a photograph) in order to be able to effect a subsequent control on the vehicle to track the unauthorized use of road which has been established.

SUMMARY OF THE INVENTION

The object of the present invention is to propose a method and a system for carrying out the method which permit reliable monitoring of the correct operation of electronic debiting appliances in the context described above and make it possible to recognize fraudulent manipulation. In particular, the aim is to ensure the authenticity of the requested status message from the debiting appliance with a very high level of reliability. The control devices used need to be able to be used flexibly, and the intention is therefore that they do not absolutely need to be permanently assigned to one monitoring site and to one lane on a continuous basis.

This object is achieved for a method of this generic type by the distinguishing features of patent claim 1. The features of dependent claims 2 to 5 make it possible to provide further embodiments of this method as advantages. A system for carrying out the method according to the invention has the features specified in claim 6. Dependent claims 7 to 12 contain advantageous developments of this system.

In a method of the generic type, the invention provides for each of the log entries on the mobile memory module also to record identifying data for the used section of the road network or of the entered geographical zone and also for the time of use. In this way, an electronic receipt, so to speak, is produced on the mobile memory module, as in the case of a ticket issued for a particular road. In addition, provision is made for the logging appliance to be wirelessly addressed by a control device arranged outside the vehicle, that is to say, for example, next to a road or on a bridge crossing the respective road. The control device, like the debiting appliance, is equipped with devices for receiving data from the navigation satellite system, that is to say it is able to ascertain its geographical position precisely. As soon as the debiting appliance is addressed by the control device, it records the time of this address and the respective data received from the navigation satellite system at this time on a nonvolatile memory. Preferably, this is the mobile memory module, on which the debits are also performed. Like the debiting appliance, the control device also records the time of address and the respective data received from the navigation satellite system at this time on a nonvolatile memory. The debiting appliance is set up such that, when it is operating correctly, it wirelessly transmits an appropriate status message, that is to say an "in order" signal, to the control device on account of the address by the control device. If no status message signaling correct operation of the debiting appliance is sent, the control device stores information to identify the vehicle passing the control device. At the same time, the current location of the vehicle when it was addressed is also recorded. This is expediently done by taking a corresponding photograph of the vehicle, as in the case of radar speed controls. During a later control on the receipt on the mobile storage medium in the vehicle being controlled, i.e. that of the driver who is accused of toll dodging, the debits entered are checked to determine whether the navigation satellite system's data recorded in the nonvolatile memory of this vehicle at the time of address by the control device corresponds to the navigation satellite system's data recorded by the control device itself for this time. This means that, besides the electronic receipt for the accused driver needing to contain a time corresponding to the recordings by the control device, the vehicle's position, which can be ascertained on the basis of the data from the navigation satellite system, at the time of control must also correspond to the control device's own position at the time of control. This ensures that the position data can be used, by way of example, to conclusively clarify whether, for example in the case of a highway with a plurality of lanes, the controlled vehicle drove in the first, second or third lane. If, for example, a vehicle from the second lane is controlled and the receipt for a vehicle from the first or third lane which was passing at the same time is held, then this can be recognized.

Such a control for fraudulent manipulation is possible, although the accuracy of the position determination when a navigation satellite system (e.g. GPS) is used is usually only approximately in an order of magnitude of 100 m. This accuracy is subject to variations over time. However, since the respective vehicle being controlled and also the control device are situated at virtually the same location, and hence also receive their signals from the same satellites, the magnitude and arithmetical sign of the determination error in the vehicle being controlled are the same as in the control device. Thus, if the position of the control device at the time of control was exactly determined and documented, then, by precisely determining the relative location of the controlled vehicle with respect to the control device, it is also possible to establish the precise geographical location of the vehicle at this time. Alternatively, the accuracy of position determination can be significantly increased from the outset by carrying out position determination while taking into account correction data which largely compensates for the variation in the measured signals, which is introduced by the operator of the navigation satellite system, in order to limit the accuracy of position determination, as is the case in DGPS position determination (Differential Global Positioning System). The control device can receive such correction signals from an appropriate transmitter and can likewise record them on its nonvolatile memory. The navigation satellite system's signals recorded on the nonvolatile memory of the controlled vehicle can then be used, taking into account this correction data, for highly accurate determination of the position of the vehicle at the time of control, which means that the vehicle's precise absolute position determined in this way can be used to conclusively decide which lane the respective vehicle was in at the time.

Recording the received signals from the navigation satellite system instead of directly recording the geographical position ensures a very high degree of data authenticity. Whereas the geographical position could be falsified by manipulation if the position of the control point were known beforehand, such falsification is practically ruled out in the case of the randomly produced data configurations of the signals from the navigation satellite system. Another significant advantage of the invention is that the control can easily be carried out at constantly changing locations using the same equipment.

It is recommended that the control device be operated at a geographical position situated in the direction of travel of the vehicle shortly before the location at which, when the debiting appliance is operating correctly, the respective log entry is made for the section of road on which the vehicle is currently traveling or for the geographical area entered. The control device is expediently operated at changing positions to remove the possibility, from drivers using the roads with fraudulent intent, of preparing for known control points in advance, that is to say of restarting the debiting appliance in time and turning it off again on uncontrolled sections of road.

The system for carrying out the method according to the invention is equipped with a multiplicity of debiting appliances which are each arranged in vehicles, automatically recognize the use of a road which is subject to charges or of a geographical zone on the basis of data which is stored in the debiting appliances and identifies roads or geographical zones which are subject to charges, and on the basis of data which can be received wirelessly in the vehicle from a navigation satellite system for the purpose of determining the respective current geographical vehicle position, and make a corresponding log entry on a mobile memory module carried in the vehicle in each case. In addition, the system contains, in the respective vehicle, a device for signaling correct operation of the debiting appliance. According to the invention, provision is made for the debiting appliance to be set up in each case to record identifying data for the used section of the road network or of the entered geographical zone and also for the time of use in the log entries on the mobile memory module as a receipt. Arranged outside the vehicles along the roads which are subject to charges or in the geographical zones is at least one control device which, like the debiting appliance, is equipped with a receiver for the data from the navigation satellite system. The control device and the debiting appliance are also each equipped with a transceiver device which the control device can use to wirelessly address the debiting appliance and which can be used to transmit a status message about correct operation of the debiting appliance to the control station. Another significant feature of the system according to the invention can be seen in that the control device and the debiting appliance are each set up to record the time at which the debiting appliance is addressed by the control device and the data received from the navigation satellite system at this time on a nonvolatile memory.

The transceiver devices in the debiting appliance and in the control device are preferably each set up to transmit infrared or RF signals. Since the ranges to be covered are generally below 100 m, only an appropriately low transmission power is required. In principle, the nonvolatile memory in the debiting appliance can be physically independent of the mobile memory module for making the charges. However, it is recommended that one and the same memory, i.e. the mobile memory module, be used for both purposes. This memory is preferably a smart card. In order to safeguard evidence which can be used in court if a vehicle abuses the road network, it is recommended that the control device be equipped with a camera which automatically takes a photograph identifying the passing vehicle being addressed if this vehicle does not return a signal confirming correct operation of the debiting appliance. To increase the absolute accuracy of position determination significantly, it is recommended that the control device be set up to receive and store appropriate correction signals (e.g. DGPS). Similarly to in the case of mobile radar appliances for speed monitoring, it is advantageous for the control device to be in the form of a mobile installation, in particular in the form of an automatically piloted installation. It can then change its location within a very short time, which means that fraudulent drivers barely have the opportunity to prepare in good time for a control being carried out.

BRIEF DESCRIPTION OF THE DRAWING

The schematic illustrative embodiment show in the FIGURE is used to describe the invention in more detail below.

DETAILED DESCRIPTION OF THE PREFERRED EMBODIMENTS

A vehicle 4 equipped with a debiting appliance 1 according to the intention is traveling on the road 8 in a road network which is subject to charges. The reference numeral 9 denotes the satellites of a navigation satellite system (e.g. GPS). The debiting appliance 1 comprises a GPS receiver 2 for receiving the signals transmitted by the GPS satellite 9. The debits for use of the road are performed by the debiting appliance 1 on the mobile memory module 10, which is a smart card, for example. In addition, the debiting appliance 1 comprises an infrared transceiver 3. An automatically piloted control device 5 parked at the edge of the road 8, e.g. on a small parking area, can use this infrared transceiver 3 to address the vehicle 4. For its part, the control device 5 likewise has an infrared transceiver 6 and also a GPS receiver 7 for receiving the data from the GPS satellites 9. Finally, the control device 5 also contains a nonvolatile memory 11 for electronically recording data. To check whether a passing vehicle 4 is operating its debiting appliance 1 correctly, the control device 5 uses its infrared transceiver 6 to send a corresponding request signal to the infrared transceiver 3 in the vehicle 4. If the debiting appliance is operating correctly, a corresponding "in order" signal is returned to the infrared transceiver 6 in the control device 5. At the time at which the vehicle 4 is addressed by the control device 5, the respective signals received from the GPS satellites 9 are recorded on a nonvolatile memory both in the vehicle 4 and in the control device 5. In the vehicle 4, this is done on the mobile memory module 10, on which the individual debits are also performed. The nonvolatile memory 11 is provided in the control device 5 for this purpose. Besides the signals from the GPS satellites 9, the exact time of address (date and time of day) is also recorded at the same time. If appropriate, other data is also recorded, such as the vehicle speed. In order to be able to conserve evidence sufficiently in the event of unauthorized use by a vehicle 4, the control device 5 is equipped with an automatically operating camera 12 which takes an identifying picture of the vehicle 4 and its exact location relative to the control device 5 at the time of control if no signal representing correct operation of the debiting appliance 1 is returned by the vehicle 4.

If a driver accused of toll dodging then later presents his electronic receipts recorded on the mobile memory module 10 for the roads which he has used, the data recorded at the time of address by the control device 5 can be used to conclusively determine whether this very vehicle was at the position at which the identifying photograph of the vehicle taken by the camera 12 was taken. In this way, manipulation by presentation of a receipt for another vehicle which passed the control point at virtually the same time can be reliably eliminated.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for monitoring correct operation of an electronic debiting appliance which is arranged in a vehicle and makes log entries on a mobile memory module in the context of a use accounting system for use of a road network or for entering a stipulated geographical zone by the vehicle, use of the road or geographical zone which is subject to charges being automatically recognized by the debiting appliance based on data which is held in a carried memory device and identifies the roads or geographical zones which are subject to charges, and based on data which can be received wirelessly in the vehicle from a navigation satellite system for purposes of determining a particular current geographical vehicle position, comprising the steps of: transmitting an "in order" signal from the vehicle if the debiting appliance is operating correctly; additionally recording identifying data for the uses section of the road network or of the entered geographical zone in the log entries on the mobile memory module, and also for the time of use, as a receipt; wirelessly addressing the debiting appliance by a control device arranged outside the vehicle; recording a time of address both in the control device and in the debiting appliance on a respective nonvolatile memory; additionally transmitting an appropriate status message wirelessly from the debiting appliance to the control operation; storing information in the control device, when there is no status message signaling correct operation of the debiting appliance, to identify the vehicle passing the control device and later subjecting the vehicle to a control; receiving data from the navigation satellite system in the control device; in addition to the time of address, recording the respective data received from the navigation satellite system at this time on the respective nonvolatile memory in both the control device and the debiting appliance; and checking to determine whether the navigation satellite system's data recorded in the nonvolatile memory in the vehicle at the time of address by the control device corresponds to the navigation satellite system's data recorded for this time by the control device itself during a later control on the debits entered on the mobile storage medium in the vehicle being controlled.

2. A method as defined in claim 1, including recording the data received from the navigation satellite system at the respective time of address on the mobile memory module in the addressed vehicle.

3. A method as defined in claim 1, including operating the control device at a geographical position which is situated in a direction of travel of the vehicle shortly before a location at which, when the debiting appliance is operating correctly, a respective log entry is made for a section of road on which the vehicle is currently traveling or for the geographical area entered.

4. A method as defined in claim 1, including changing positions at which the control device is operated.

5. A method as defined in claim 1, including ascertaining, during a check on a debit on the mobile memory module, a precise position of the location of the vehicle being controlled at the time of address by the control device based on the recorded data from the navigation satellite system, taking into account correction data which largely compensates for a variation in measured signals, which is introduced by an operator of the navigation satellite system, in order to limit accuracy of position determination.

6. A system for monitoring correct operation of debiting appliances respectively arranged in vehicles, the system comprising: a mobile memory module in each of the vehicles; a plurality of debiting appliances respectively arranged in the vehicles and operative to automatically recognize use of a road which is subject to charges or of a geographical zone based on data which is stored in the debiting appliances and identifies roads or geographical zones which are subject to charges, and based on data received wirelessly in the vehicle from a navigation satellite system for determining a respective current geographical vehicle position, and make corresponding log entry on the mobile memory module carried in the vehicle in each case; a device in each respective vehicle operative for signaling correct operation of the debiting appliance, each of the debiting appliances being operatively configured to record identifying data for a used section of the road network or of an entered geographical zone and also for a time of use in the log entries on the mobile memory module as a receipt; and at least one control device arranged outside the vehicles along the road which is subject to charges or in the geographical zones, the control device and each of the debiting appliances being respectively equipped with a transceiver device so that the control device can wirelessly address the debiting appliance, the transceiver devices being operative to transmit a status message about correct operation of the debiting appliance to the control device, the control device and the debiting appliance each having a nonvolatile memory and being operative to record a time at which the debiting appliance is addressed by the control device on the nonvolatile memory, the control device also having a receiver for the data from the navigation satellite system, the control device and the debiting appliance each being operative to record, besides the time at which the debiting appliance is addressed by the control device, the data received from the navigation satellite system at this time on the nonvolatile memory.

7. A system as defined in claim 6, wherein the transceiver devices in the debiting appliance and in the control device are each set up to transmit one of infrared signals and RF signals.

8. A system as defined in claim 6, wherein the nonvolatile memory in the debiting appliance is identical to the mobile memory module.

9. A system as defined in claim 6, wherein the control device is operative to receive and store correction signals for increasing accuracy of determination of the geographical position from the data from the navigation satellite system.

10. A system as defined in claim 6, wherein the control device is a mobile installation.

11. A system as defined in claim 10, wherein the control device is an automatically piloted installation.

12. A system as defined in claim 6, wherein the mobile memory module is a smart card.

13. A system as defined in claim 6, wherein the control device includes a camera operative to automatically photograph the passing vehicle being addressed if the vehicle does not return a signal confirming correct operation of the debiting appliance.

* * * * *